United States Patent
Dong et al.

(10) Patent No.: US 10,298,490 B2
(45) Date of Patent: May 21, 2019

(54) COEXISTENCE AND MIGRATION OF LEGACY ETHERNET AND OVERLAY NETWORKS

(71) Applicant: Cisco Technology, Inc., San Jose, CA (US)

(72) Inventors: Liqin Dong, San Jose, CA (US); Yibin Yang, San Jose, CA (US); Lukas Krattiger, Pleasanton, CA (US); Xinggang Zhou, Fremont, CA (US); Di Jin, Fremont, CA (US); Siu-Man Leung, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 14/963,470

(22) Filed: Dec. 9, 2015

(65) Prior Publication Data

US 2017/0171056 A1    Jun. 15, 2017

(51) Int. Cl.
| | |
|---|---|
| H04L 29/06 | (2006.01) |
| H04L 12/721 | (2013.01) |
| H04L 12/46 | (2006.01) |
| H04L 12/66 | (2006.01) |
| H04L 12/715 | (2013.01) |
| H04L 12/775 | (2013.01) |
| H04L 12/753 | (2013.01) |

(52) U.S. Cl.
CPC .......... *H04L 45/66* (2013.01); *H04L 12/4641* (2013.01); *H04L 12/66* (2013.01); *H04L 45/58* (2013.01); *H04L 45/64* (2013.01); *H04L 45/48* (2013.01)

(58) Field of Classification Search
USPC ........................................................ 370/256
See application file for complete search history.

(56) References Cited

U.S. PATENT DOCUMENTS

| | | | |
|---|---|---|---|
| 7,209,435 B1* | 4/2007 | Kuo ........................ | H04L 45/00 370/219 |
| 2012/0182866 A1* | 7/2012 | Vinayagam ........... | H04L 45/245 370/228 |
| 2013/0003601 A1* | 1/2013 | Gupta ................... | H04L 12/462 370/254 |
| 2014/0092907 A1* | 4/2014 | Sridhar ................... | H04L 45/74 370/392 |

(Continued)

*Primary Examiner* — Gregory B Sefcheck
*Assistant Examiner* — Majid Esmaeilian
(74) *Attorney, Agent, or Firm* — Merchant & Gould P.C.

(57) ABSTRACT

Coexistence and migration of legacy and VXLAN networks may be provided. A first anchor leaf switch and a second anchor leaf switch may detect that they can reach each other over a Virtual Extensible Local Area Network (VXLAN) overlay layer 2 network. In response to detecting that they can reach each other over the VXLAN, the second anchor leaf switch may block VLANs mapped to the VXLAN's VXLAN Network Identifier (VNI) on the second anchor leaf switch's ports connecting to spine routers. In addition, the first anchor leaf switch and the second anchor leaf switch may detect that they can reach each other over a physical layer 2 network. In response to detecting that they can reach each other over a physical layer 2 network, the second anchor leaf switch may block Virtual Extensible Local Area Network (VXLAN) segments at the second anchor leaf switch.

20 Claims, 5 Drawing Sheets

(56) References Cited

U.S. PATENT DOCUMENTS

| | | | | |
|---|---|---|---|---|
| 2015/0055650 A1* | 2/2015 | Bhat | .................... | H04L 12/185 370/390 |
| 2015/0200847 A1* | 7/2015 | Gourlay | ................. | H04L 49/70 370/392 |
| 2015/0200954 A1* | 7/2015 | Gourlay | ................. | H04L 49/70 726/4 |
| 2015/0355934 A1* | 12/2015 | Yin | ........................ | H04L 49/70 718/1 |
| 2016/0036774 A1* | 2/2016 | Chong | ................... | H04L 45/02 370/392 |
| 2016/0112328 A1* | 4/2016 | Anand | ................... | H04L 47/22 370/236.2 |
| 2017/0085488 A1* | 3/2017 | Bhattacharya | ...... | H04L 47/2425 |

\* cited by examiner

COEXISTENCE AND MIGRATION OF LEGACY ETHERNET AND OVERLAY NETWORKS

TECHNICAL FIELD

The present disclosure relates generally to network coexistence and migration.

BACKGROUND

Virtual Extensible LAN (VXLAN) is a network virtualization technology that attempts to ameliorate the scalability problems associated with large cloud computing deployments. It uses a VLAN-like encapsulation technique to encapsulate MAC-based OSI layer 2 Ethernet frames within layer 4 UDP packets, using 4789 as the default IANA-assigned destination UDP port number. VXLAN is an evolution of efforts to standardize on an overlay encapsulation protocol. It increases scalability up to 16 million logical networks and allows for layer 2 adjacency across IP networks. Multicast or unicast with HER (Head-End Replication) is used to flood BUM (broadcast, unknown destination address, multicast) traffic.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
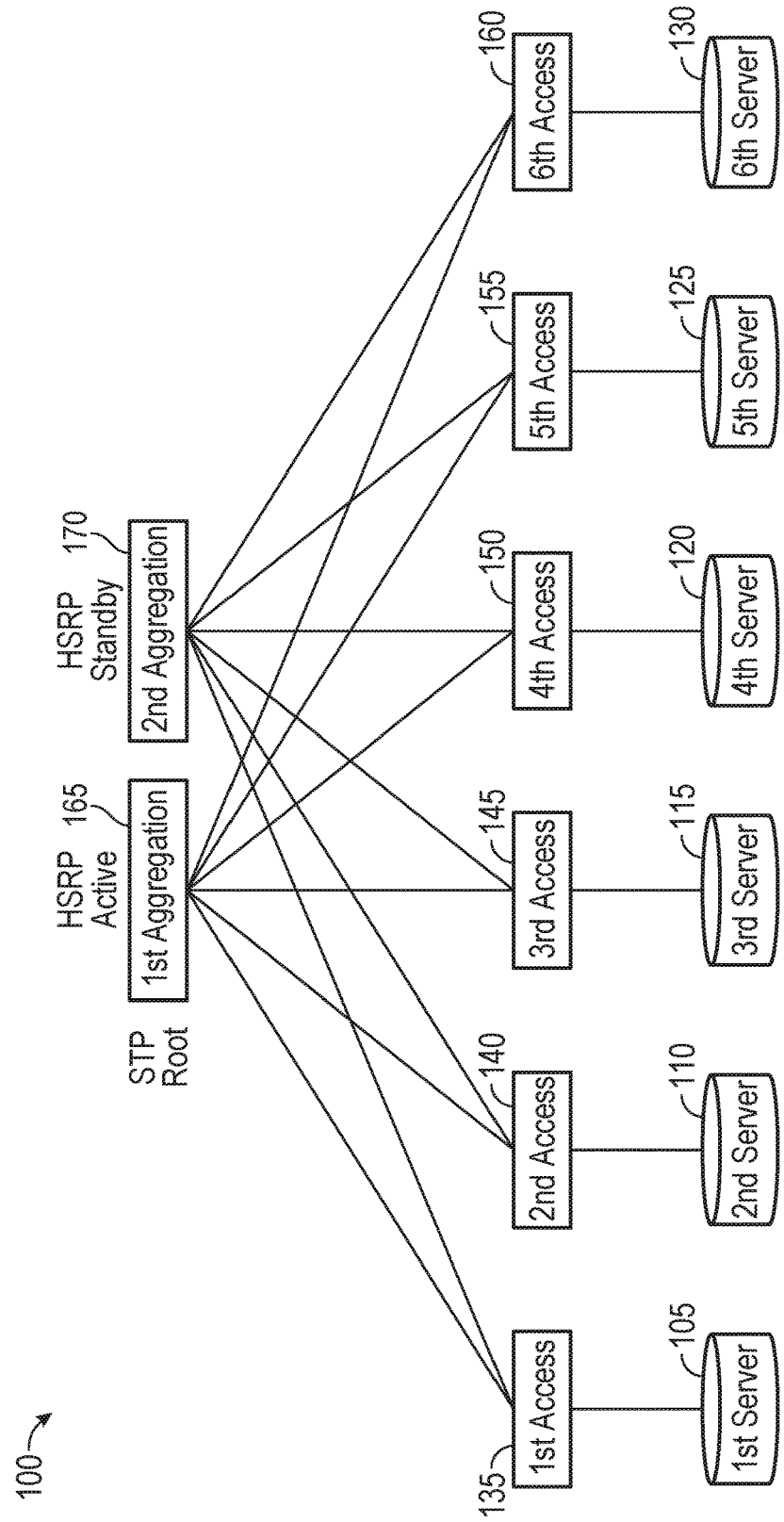
FIG. 1 shows a legacy Ethernet based layer 2 deployment.

Coexistence and migration of networks may be provided. A first anchor leaf switch and a second anchor leaf switch or a non-anchor VXLAN enabled leaf may detect that they can reach each other over a Virtual Extensible Local Area Network (VXLAN) overlay layer 2 network. In response to detecting that they can reach each other over the VXLAN, the second anchor leaf switch or the non-anchor leaf may block VLANs mapped to the VXLAN's VXLAN Network Identifier (VNI) on its ports connecting to spine routers. In addition, the first anchor leaf switch and the second anchor leaf switch may detect that they can reach each other over a physical layer 2 network. In response to detecting that they can reach each other over a physical layer 2 network, the second anchor leaf switch may block Virtual Extensible Local Area Network (VXLAN) segments at the second anchor leaf switch.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Virtual Extensible Local Area Network (VXLAN) is a scheme of layer 2 overlay on top of layer 3. It encapsulates Ethernet frames with a VXLAN header and uses UDP/IP for transport. The VXLAN header contains VXLAN segment ID/VXLAN network identifier (VNI), which is a 24-bit field to identify virtual network segments for different tenants. VXLAN tunnel end point (VTEP) is a software or hardware component that performs actual VXLAN encapsulation and de-capsulation. A VXLAN segment is enabled on a VTEP only when a user configures its VNI under the logical interface of the VTEP. To support the introduction of VXLAN based networks, it is important to provide migration schemes so that a legacy Ethernet based layer 2 deployment can be gradually and smoothly replaced by a VXLAN overlay.

FIG. 1 shows a legacy Ethernet based layer 2 deployment 100. As shown in FIG. 1, deployment 100 may comprise a plurality of servers, a plurality of access switches, and a plurality of aggregation routers. The plurality of servers may comprise, but are not limited to, a first server 105, a second server 110, a third server 115, a fourth server 120, a fifth server 125, and a sixth server 130. The plurality of access switches may comprise, but are not limited to, a first access switch 135, a second access switch 140, a third access switch 145, a fourth access switch 150, a fifth access switch 155, and a sixth access switch 160. The plurality of aggregation routers may comprise, but are not limited to, a first aggregation router 165 and a second aggregation router 170. Each of the plurality of servers may connect to a respective one of the plurality of access switches. Each of the plurality of access switches may connect to each of the plurality of aggregation routers.

Deployment 100 may use Spanning Tree Protocol (STP) to provide loop protection and has layer 2/layer 3 demarcation at the aggregation layer. The aggregation layer may run a First-Hop Redundancy Protocol (FHRP) such as Hot Standby Router Protocol (HSRP) and Virtual Router Redundancy Protocol (VRRP) to achieve layer 3 redundancy. For load balancing, first aggregation router 165 may comprise an HSRP active router and STP root for a first set of server VLANs while second aggregation router 170 may comprise an HSRP active router and STP root for a second set of server VLANs.

To migrate legacy Ethernet based layer 2 deployment 100 to a spine/leaf deployment with VXLAN overlay, the plurality of access switches may become a plurality of leaf switches and the plurality of aggregation routers may become a plurality of spine routers. In this example, the layer 3 gateway may be shifted from the aggregation layer (i.e., plurality of aggregation routers) to a couple of leaf switches called anchor leaf switches until it can finally be distributed among all leaf switches.

During migration from legacy Ethernet based layer 2 deployment 100 to a VXLAN overlay deployment (e.g., EVPN VXLAN), the physical layer 2 network shown in FIG. 1 may need to coexist with a VXLAN overlay layer 2 network. The layer 2 VXLAN overlay may initially span across the legacy Ethernet based layer 2 network using VLAN (underlay). While STP may be used in a legacy Ethernet based layer 2 network to avoid loop, the same may not be used across the VXLAN overlay, for example, due to hardware and/or software restrictions. At the time where a VLAN (e.g., legacy VLAN 10) and VXLAN (e.g., VLAN 10 mapped to VNI 10000) need to coexist during the migration, the problem of forming a potential loop between overlay and underlay may need to be prevented.

While embodiments of the disclosure use EVPN VXLAN migration as an example, the loop problem also exist in any other network topologies that allow co-existence of VLAN segments and VXLAN segments for the same subnet. Embodiments of the disclosure may provide a solution for the respective migration scenarios, at which time a subnet can span over legacy VLAN segments and VXLAN overlay segments.

Figure 2:
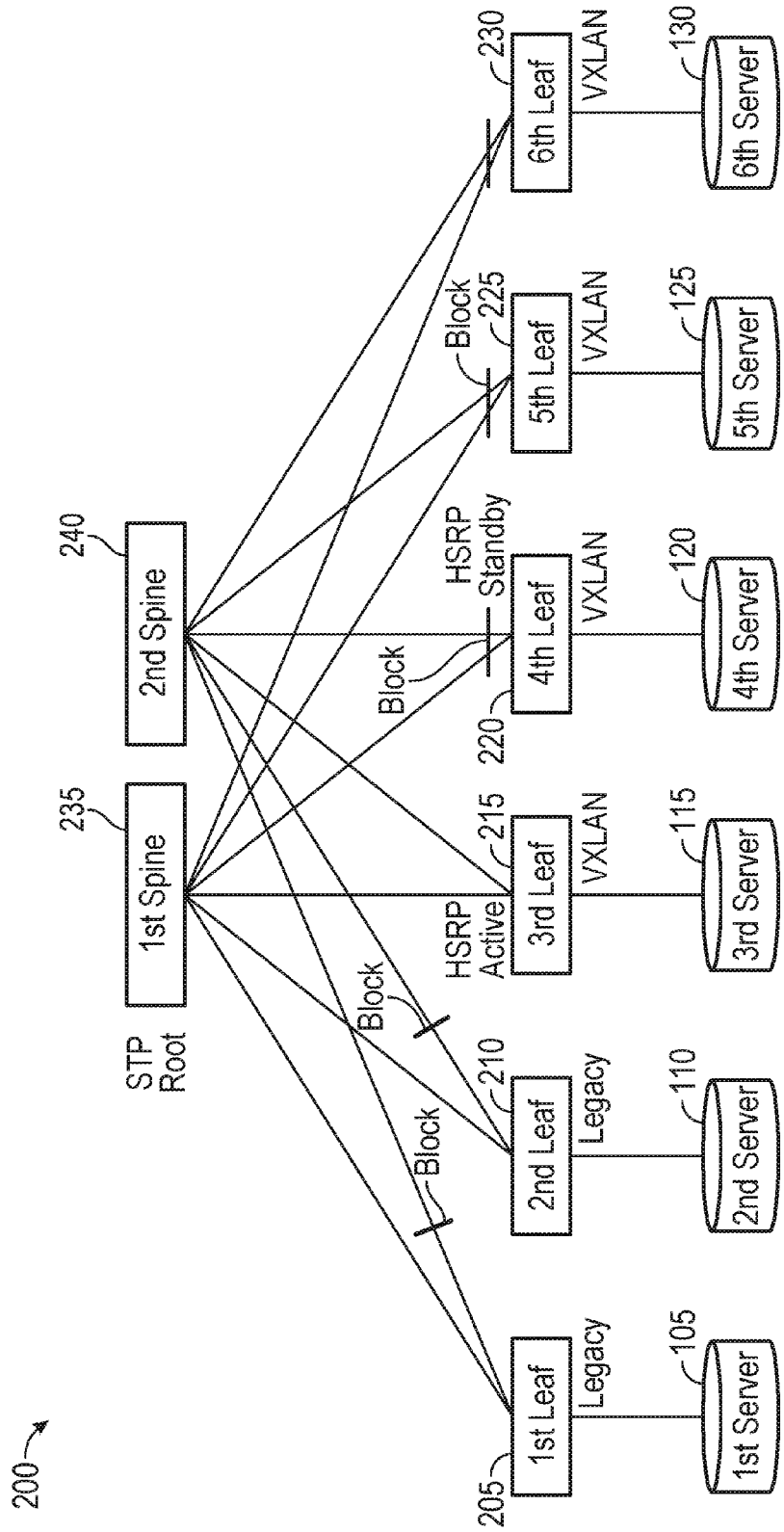
FIG. 2 shows a migration scenario deployment with physical Ethernet layer 2 network blocking.

FIG. 2 shows a migration scenario deployment 200 with physical Ethernet layer 2 network blocking. As shown in FIG. 2, deployment 200 may comprise the plurality of servers, a plurality of leaf switches, and a plurality of spine routers. The plurality of leaf switches may comprise, but are not limited to, a first leaf switch 205, a second leaf switch 210, a third leaf switch 215, a fourth leaf switch 220, a fifth leaf switch 225, and a sixth leaf switch 230. The plurality of spine routers may comprise, but are not limited to, a first spine router 235 and a second spine router 240. Each of the plurality of servers may connect to a respective one of the plurality of leaf switches. Each of the plurality of leaf switches may connect to each of the plurality of spine routers.

During a migration, a subnet can consist of both VLAN and VXLAN segments. Anchor leafs may comprise the connecting switches of the two segments (VLAN/VXLAN). Embodiments of the disclosure may detect that the anchor leafs are reachable from each other over the VLAN or VXLAN segment. Furthermore, embodiments of the disclosure may ensure that no loops form when the two segments are connected if anchor leafs are reachable from each other over both VLAN and VXLAN segments. Embodiments of the disclosure are not limited to VXLAN and may be used, for example, with coexistence and migration of legacy Ethernet and overlay Networks.

First leaf switch 205 and second leaf switch 210 may be legacy Ethernet switches that may not be VXLAN enabled. The other leaf switches (third leaf switch 215, fourth leaf switch 220, fifth leaf switch 225, and sixth leaf switch 230) may be VXLAN enabled. Third leaf switch 215 and fourth leaf switch 220 may be anchor leaf switches. In deployment 200, the HSRP function may be shifted from first aggregation router 165 and second aggregation router 170 to anchor leaf switches (e.g., third leaf switch 215 and fourth leaf switch 220) that may be layer 3 gateways for leaf switches that have not been upgraded (e.g., first leaf switch 205 and second leaf switch 210) to, for example, distributed anycast layer 3 gateways of VXLAN fabric yet. First spine router 235 and second spine router 240 may serve as transit nodes that may perform legacy layer 2 switching for VLAN segments and forward based on outer IP headers for VXLAN overlay segments.

Embodiments of the disclosure may provide loop prevention during migration. The anchor leafs (e.g., third leaf switch 215 and fourth leaf switch 220) may detect if they can reach each other over the VXLAN overlay layer 2 network through the existing VXLAN neighbor learning mechanism, such as Multiprotocol BGP (MP-BGP) EVPN address-family. For example, through a MP-BGP session, fourth leaf switch 220 may learn that third leaf switch 215 is reachable over the VXLAN overlay for a particular segment.

An anchor leaf may serve as the HSRP standby router for a set of server VLANs. When the anchor leaf that serves as the HSRP standby router detects it can reach the anchor leaf serving as the HSRP active router over the VXLAN layer 2 overlay, the anchor leaf that serves as the HSRP standby router may block the server VLANs, mapped to the VXLAN VNI, on its ports connecting to spine routers. The blocking can be implemented through manipulating STP port state or installing network access control lists (ACLs). For example, once fourth leaf switch 220 detects it can reach third leaf switch 215 over the VXLAN layer 2 overlay, fourth leaf switch 220 may block the server VLANs on its ports connecting to first spine router 235 and second spine router 240. A regular non-anchor VXLAN enabled leaf switch may block all server VLANs on its ports connecting to spine routers once it detects that anchor leaf switches are reachable via VXLAN layer 2 overlay. For example, fifth leaf switch 225 and sixth leaf switch 230 may block all server VLANs on their ports connecting to first spine router 235 and second spine router 240.

Figure 3:
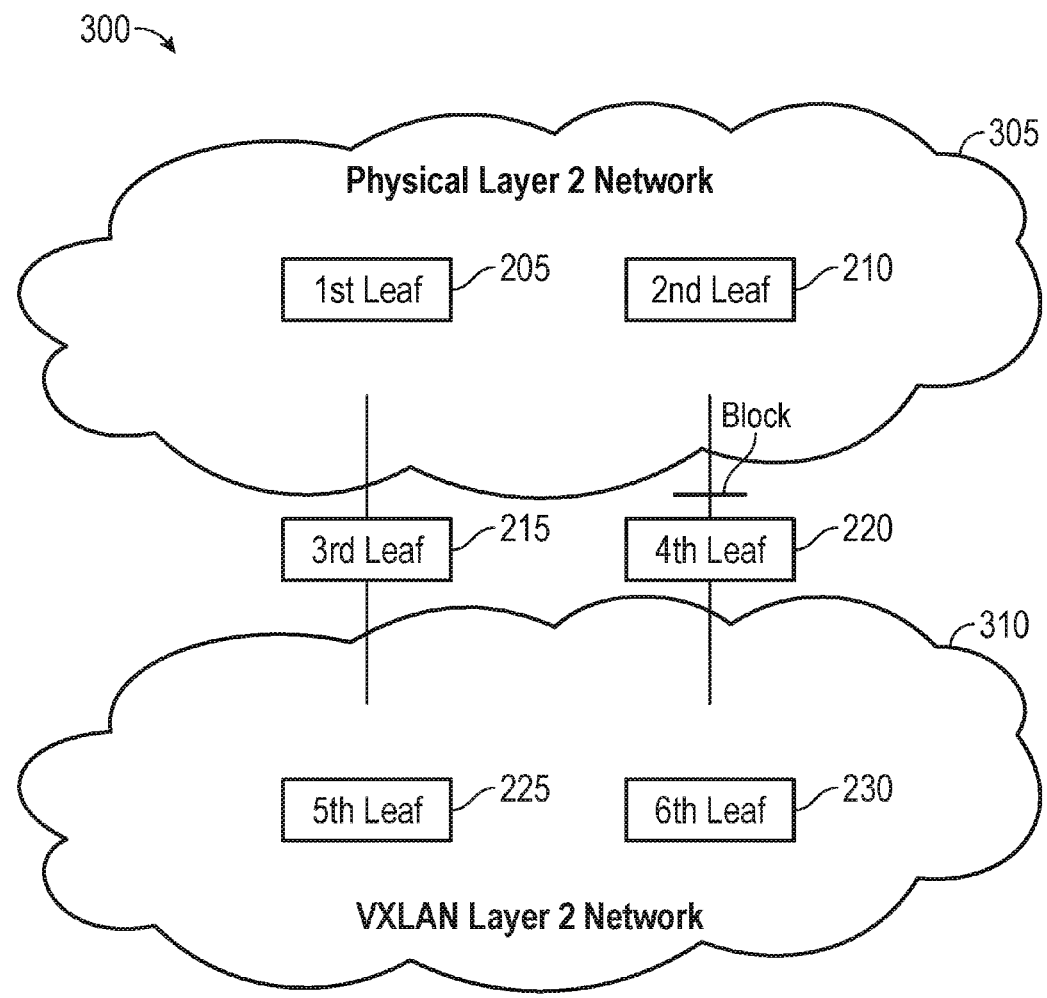
FIG. 3 shows a logical view of the migration scenario deployment of FIG. 2 with physical Ethernet layer 2 network blocking.

FIG. 3 shows a logical view 300 of migration scenario deployment 200 of FIG. 2 with physical Ethernet layer 2 network blocking. Each of the plurality of leaf switches may function based on its role. For example, non-VXLAN enabled leaf switches (e.g., first leaf switch 205 and second leaf switch 210) may reside in a physical (Ethernet) layer 2 network 305. Non-anchor VXLAN enabled leaf switches (e.g., fifth leaf switch 225 and sixth leaf switch 230) may reside in a VXLAN overlay layer 2 network 310 by always blocking all server VLANs on ports connecting to the plurality of spine routers.

The anchor leaf switches (e.g., third leaf switch 215 and fourth leaf switch 220) may connect physical and VXLAN layer 2 networks. For example, fourth leaf switch 220 may serve as the HSRP standby router for a set of server VLANs. By blocking these server VLANs on fourth leaf switch 220's ports connecting to the plurality of spine routers (e.g., first spine router 235 and second spine router 240), fourth leaf switch 220 may be disallowed from connecting physical (Ethernet) layer 2 network 305 to VXLAN segments in VXLAN overlay layer 2 network 310. Accordingly, loops may not form because third leaf switch 215 may be the only anchor leaf that connects these server VLAN segments with VXLAN overlay layer 2 segments, which may be unambiguously determined by third leaf switch 215's HSRP active router role. In the case where third leaf switch 215 fails and can no longer be the HSRP active router, fourth leaf switch 220 may become the HSRP active router and may unblock the formerly blocked server VLANs. Failure protection of HSRP remains effective with this scheme.

The blocking of server VLANs may only be needed during the migration phase. Once the migration is complete, these VLANs may no longer be needed on the core ports and can be removed/disallowed from these ports because only VXLAN overlay traffic may flow in the core.

Figure 4:
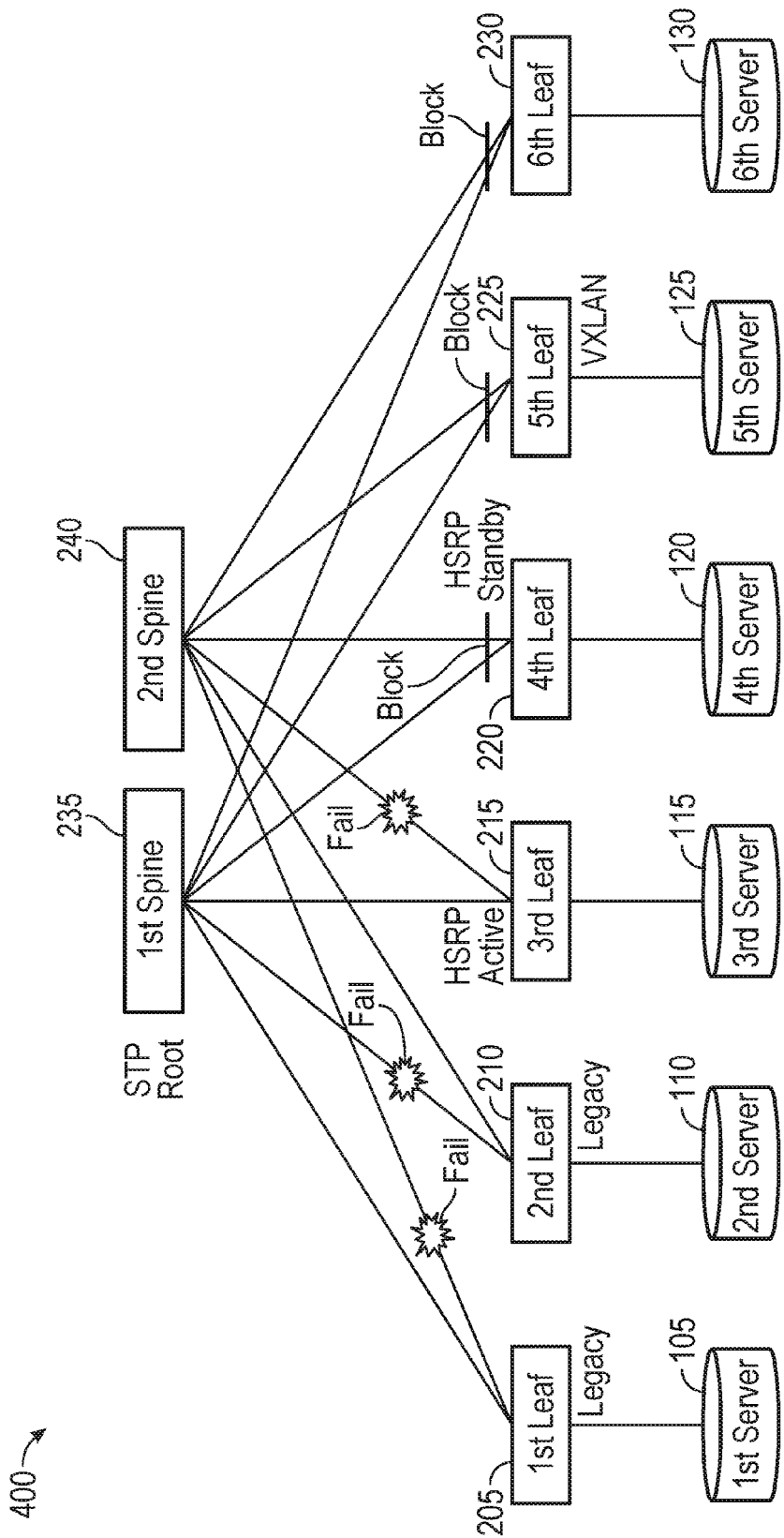
FIG. 4 shows a migration scenario deployment with physical Ethernet layer 2 network blocking.

Migration scenario deployment 200 of FIG. 2 may have reduced ways of redundancy as illustrated by deployment 400 of FIG. 4. Because server VLANs may be blocked on fourth leaf switch 220's ports connecting to the plurality of spine routers, fourth leaf switch 220 may no longer serve as a transit switch in the physical layer 2 network. In FIG. 4, there is only 3-way redundancy in the physical layer 2 network. Three broken links (i.e., fails) lead to partitioning of the physical layer 2 network, where first leaf switch 205 and third leaf switch 215 are in one partition while second leaf switch 210 is in another partition. If server VLANs were not blocked on fourth leaf switch 220's ports connecting to the plurality of spine routers, there would be 4-way redundancy and the physical layer 2 network may not be partitioned.

The partitioning of the physical Ethernet layer 2 network as described above cannot be repaired, even if the VXLAN overlay layer 2 network remains connected. The VXLAN overlay layer 2 network is connected because VXLAN packets are tagged with Ethernet core VLANs (different from server VLANs), which are not blocked on fourth leaf switch 220's ports connecting to the plurality of spine routers. As shown in FIG. 4, if fourth leaf switch 220 did not block server VLANs on its ports connecting to the plurality of spine routers, it would encapsulate second leaf switch 210's traffic into the VXLAN overlay and forward to third leaf switch 215. Then third leaf switch 215 can de-capsulate VXLAN packets and forward to first leaf switch 205. The partitioning in the physical Ethernet layer 2 network would be repaired by the VXLAN overlay layer 2 network.

Figure 5:
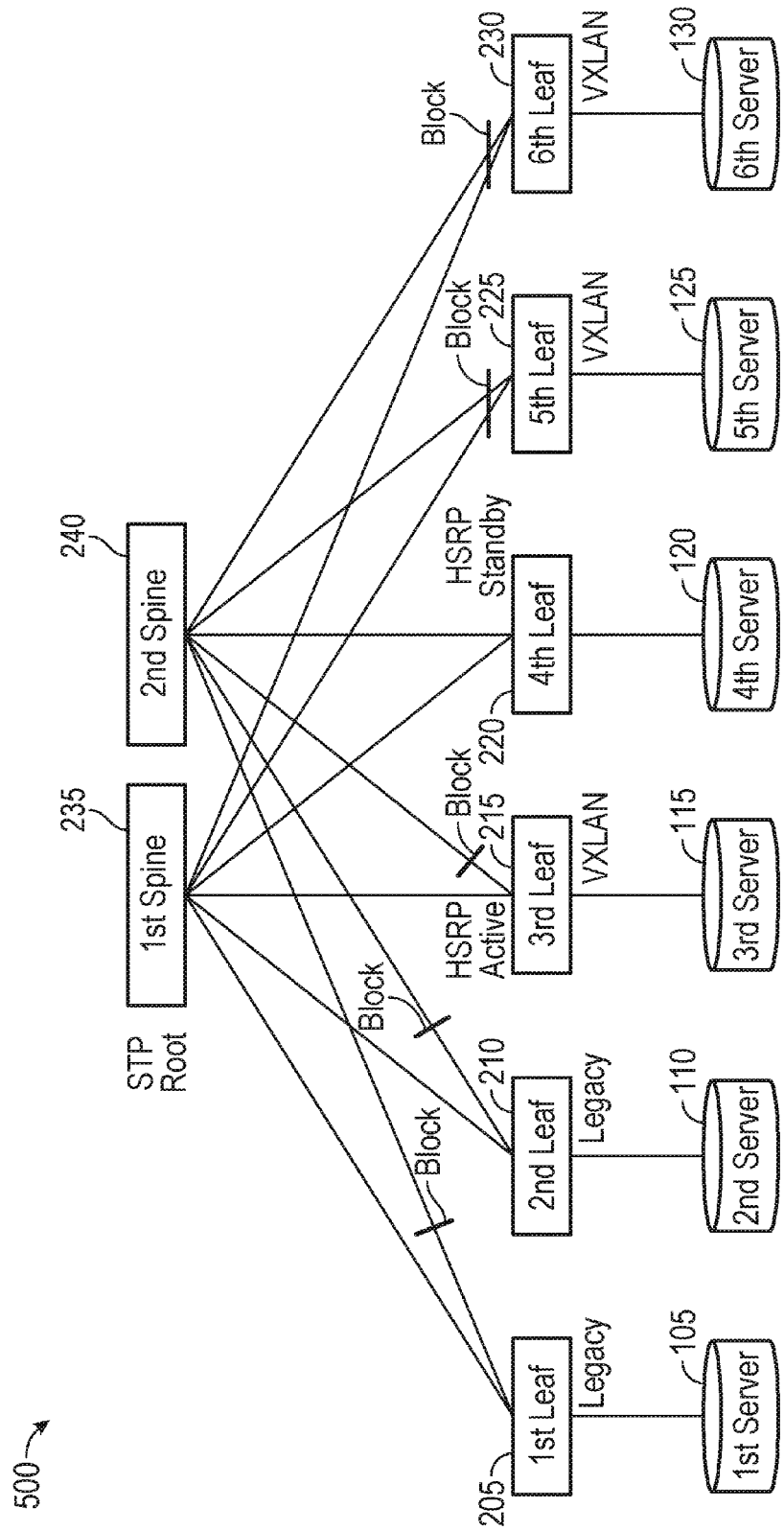
FIG. 5 shows a migration scenario deployment with VXLAN overlay layer 2 network blocking.

FIG. 5 shows a migration scenario deployment 500 with VXLAN overlay layer 2 network blocking that may remedy the aforementioned partitioning. As shown in FIG. 5, the anchor leaf switches (e.g., third leaf switch 215 and fourth leaf switch 220) may detect if they can reach each other over the physical layer 2 network. The detection can be done inband, by running Connectivity Fault Management (CFM) continuity check, or out-of-band, by exchanging STP roots via network management. For example, fourth leaf switch 220 may detect it can reach third leaf switch 215 via the physical Ethernet layer 2 network if it learns through network management that it has the same STP root as third leaf switch 215.

Consider an anchor leaf serving as the HSRP standby router for a set of server VLANs (e.g., fourth leaf switch 220). When it detects it can reach the anchor leaf serving as the HSRP active router (e.g., third leaf switch 215) over the physical Ethernet layer 2 network as described above, it blocks the corresponding VXLAN segments. The blocking can be implemented through not configuring the VNI in the logical interface of the VTEP. For example, once fourth leaf switch 220 detects it can reach third leaf switch 215 over the physical layer 2 network, it may block the VXLAN segments by not configuring their VNIs under the VTEP interface. A non-anchor VXLAN enabled leaf blocks all server VLANs on its ports connecting to the plurality of spine routers. For example, fifth leaf switch 225 and sixth leaf switch 230 may block all server VLANs on their ports connecting to the plurality of spine routers (e.g., first spine router 235 and second spine router 240).

As shown in FIG. 5, because third leaf switch 215 and fourth leaf switch 220 can reach each other over the physical layer 2 network, for those server VLANs that fourth leaf switch 220 serves as the HSRP standby router, it blocks their corresponding VXLAN segments. In this way, fourth leaf switch 220 can serve as a transit switch in the physical layer 2 network and four-way redundancy can be achieved. If the physical layer 2 network is partitioned in such a way that fourth leaf switch 220 detects it cannot reach third leaf switch 215, fourth leaf switch 220 will unblock the VXLAN segments. Upon unblocking, physical layer 2 network partitions can be repaired via the VXLAN overlay layer 2 network.

When all leaf switches in the fabric are upgraded and VXLAN enabled, the HSRP configuration can be removed at the anchor leaf switches, the server VLANs can be removed/disallowed from leaf switches' core ports completely, and the whole fabric will runs in VXLAN mode. On the other hand, if some of the leaf switches cannot be upgraded due to hardware restrictions, those leaf switches may stay as is and forward traffic to anchor leaf switches for layer 2 switching and layer 3 routing.

Embodiments of the disclosure may provide: i) migration schemes for legacy layer 2 fabric to transit to VXLAN fabric such as EVPN VXLAN fabric; ii) a physical layer 2 network blocking solution for migration to VXLAN fabric such as EVPN VXLAN fabric; and iii) a VXLAN layer 2 network blocking solution for migration to VXLAN fabric such as EVPN VXLAN fabric. The loop prevention schemes consistent with embodiments of the disclosure may apply to EVPN VXLAN fabric migration, as well as any network that has a subnet spanning over legacy VLAN segments and VXLAN overlay segments.

Embodiments of the disclosure may allow a legacy layer 2 network to migrate to VXLAN fabric, such as EVPN VXLAN fabric, or co-exist with VXLAN fabric and prevent loop when connecting VLAN and VXLAN segments during VXLAN fabric migration or co-existent of legacy layer 2 network and VXLAN fabric. Also, embodiments of the disclosure may minimize changes by taking advantage of the existing HSRP mechanism for blocking decisions and repair physical layer 2 network partitioning.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    migrating layer 3 gateways from a first aggregation router and a second aggregation router to a first anchor leaf switch and a second anchor leaf switch, wherein the first aggregation router and the second aggregation router are connected to both the first anchor leaf switch and the second anchor leaf switch, and wherein the first anchor leaf switch and the second anchor leaf switch comprise connecting switches of a virtual local area network segment and a virtual extendible local area network segment;
    detecting, by the first anchor leaf switch comprising an active router for at least one server and the second anchor leaf switch comprising a standby router for the at least one server during migrating the layer 3 gateways, that the first anchor leaf switch and the second anchor leaf switch can reach each other over a Virtual Extensible Local Area Network (VXLAN) overlay layer 2 network;
    blocking, by the second anchor leaf switch in response to detecting that the first anchor leaf switch and the second anchor leaf switch can reach each other over the VXLAN overlay layer 2 network to prevent loops during migrating the layer 3 gateways, Virtual Local Area Networks (VLANs) mapped to the VXLAN's VXLAN Network Identifier (VNI) on the second anchor leaf switch's ports connecting to spine routers comprising the first aggregation router and the second aggregation router; and
    unblocking, in response to determining that migrating the layer 3 gateways is complete, the previously blocked VLANs mapped to the VXLAN's VNI on the second anchor leaf switch's ports connecting to the spine routers comprising the first aggregation router and the second aggregation router.

2. The method of claim 1, wherein the first anchor leaf switch comprises an active layer 3 gateway.

3. The method of claim 1, wherein detecting by the first anchor leaf switch and the second anchor leaf switch comprises detecting by the first anchor leaf switch and the second anchor leaf switch wherein the first anchor leaf switch comprises an active layer 3 gateway running one of the following: First Hop Redundancy Protocol (FHRP); Hot Standby Router Protocol (HSRP); and Virtual Router Redundancy Protocol (VRRP).

4. The method of claim 1, wherein detecting by the first anchor leaf switch and the second anchor leaf switch comprises detecting by the first anchor leaf switch and the second anchor leaf switch wherein the second anchor leaf switch comprises a standby layer 3 gateway.

5. The method of claim 1, wherein detecting by the first anchor leaf switch and the second anchor leaf switch comprises detecting by the first anchor leaf switch and the second anchor leaf switch wherein the second anchor leaf switch comprises a standby layer 3 gateway running one of the following: First Hop Redundancy Protocol (FHRP); Hot Standby Router Protocol (HSRP); and Virtual Router Redundancy Protocol (VRRP).

6. The method of claim 1, wherein detecting by the first anchor leaf switch and the second anchor leaf switch that the first anchor leaf switch and the second anchor leaf switch can reach each other over the Virtual Extensible Local Area Network (VXLAN) overlay layer 2 network comprises using a Multiprotocol-Border Gateway Protocol (MP-BGP) session.

7. The method of claim 1, wherein blocking the Virtual Local Area Networks (VLAN) mapped to the VXLAN's VXLAN Network Identifier (VNI) on the second anchor leaf switch's ports connecting to the spine routers comprises one of the following: manipulating Spanning Tree Protocol (STP) port state and installing network access control lists (ACLs).

8. The method of claim 1, further comprising blocking, by non-anchor VXLAN enabled leaf switches in response to detecting that the first anchor leaf switch and the non-anchor leaf can reach each other via the VXLAN overlay layer 2 network, VLANs mapped to the VNIs on the non-anchor leaf switches on ports connecting to the spine routers.

9. A method comprising:
migrating layer 3 gateways from a first aggregation router and a second aggregation router to a first anchor leaf switch and a second anchor leaf switch, wherein the first aggregation router and the second aggregation router are connected to both the first anchor leaf switch and the second anchor leaf switch, and wherein the first anchor leaf switch and the second anchor leaf switch comprise connecting switches of a virtual local area network segment and a virtual extendible local area network segment;
detecting, by the first anchor leaf switch comprising an active router for at least one server and the second anchor leaf switch comprising a standby router for the at least one server during migrating the layer 3 gateways, that the first anchor leaf switch and the second anchor leaf switch can reach each other over a physical layer 2 network;
blocking, by the second anchor leaf switch in response to detecting that the first anchor leaf switch and the second anchor leaf switch can reach each other over the physical layer 2 network during migrating the layer 3 gateways, the Virtual Extensible Local Area Network (VXLAN) segment at the second anchor leaf switch to prevent loops during migrating the layer 3 gateways; and
unblocking, in response to determining that migrating the layer 3 gateways is complete, the previously blocked VXLAN segment at the second anchor leaf switch.

10. The method of claim 9, wherein the first anchor leaf switch comprises an active layer 3 gateway.

11. The method of claim 9, wherein detecting by the first anchor leaf switch and the second anchor leaf switch comprises detecting by the first anchor leaf switch and the second anchor leaf switch wherein the first anchor leaf switch comprises an active layer 3 gateway running one of the following: First Hop Redundancy Protocol (FHRP); Hot Standby Router Protocol (HSRP); and Virtual Router Redundancy Protocol (VRRP).

12. The method of claim 9, wherein detecting by the first anchor leaf switch and the second anchor leaf switch comprises detecting by the first anchor leaf switch and the second anchor leaf switch wherein the second anchor leaf switch comprises a standby layer 3 gateway.

13. The method of claim 9, wherein detecting by the first anchor leaf switch and the second anchor leaf switch comprises detecting by the first anchor leaf switch and the second anchor leaf switch wherein the second anchor leaf switch comprises a standby layer 3 gateway running one of the following: First Hop Redundancy Protocol (FHRP); Hot Standby Router Protocol (HSRP); and Virtual Router Redundancy Protocol (VRRP).

14. The method of claim 9, wherein detecting by the first anchor leaf switch and the second anchor leaf switch that the first anchor leaf switch and the second anchor leaf switch can reach each other over a physical layer 2 network comprises running a Connectivity Fault Management (CFM) continuity check.

15. The method of claim 9, wherein detecting by the first anchor leaf switch and the second anchor leaf switch that the first anchor leaf switch and the second anchor leaf switch can reach each other over a physical layer 2 network comprises exchanging Spanning Tree Protocol (STP) roots via network management.

16. The method of claim 9, wherein blocking, by the second anchor leaf switch in response to detecting that the first anchor leaf switch and the second anchor leaf switch can reach each other the physical layer 2 network, Virtual Extensible Local Area Network (VXLAN) segments at the second anchor leaf switch comprises not configuring the VXLAN segments' Network Identifiers (VNIs) under a VXLAN Tunnel End Point (VTEP) interface.

17. A system comprising:
spine routers comprising a first aggregation router and a second aggregation router;
a first anchor leaf switch comprising an active layer 3 gateway and comprising an active router for at least one server; and
a second anchor leaf switch comprising a standby router for the at least one server, the second anchor leaf switch comprising a standby layer 3 gateway, wherein layer 3 gateways are migrated from the first aggregation router and the second aggregation router to the first anchor leaf switch and the second anchor leaf switch, wherein the first aggregation router and the second aggregation router are connected to both the first anchor leaf switch and the second anchor leaf switch, and wherein the first anchor leaf switch and the second anchor leaf switch comprise connecting switches of a virtual local area network segment and a virtual extendible local area network segment, wherein the first anchor leaf switch and the second anchor leaf switch reach each other over a Virtual Extensible Local Area Network (VXLAN) overlay layer 2 network, wherein Virtual Local Area Networks (VLANs) mapped to the VXLAN's VXLAN Network Identifier (VNI) on the second anchor leaf switch's ports connecting to the spine routers are blocked by the second anchor leaf switch to prevent loops during migrating the layer 3 gateways when the layer 3 gateways are being migrated and unblocked in response to determining that migrating the layer 3 gateways is complete.

18. The system of claim 17, wherein the first anchor leaf switch runs one of the following: First Hop Redundancy Protocol (FHRP); Hot Standby Router Protocol (HSRP); and Virtual Router Redundancy Protocol (VRRP).

19. The system of claim 17, wherein the second anchor leaf switch runs one of the following: First Hop Redundancy Protocol (FHRP); Hot Standby Router Protocol (HSRP); and Virtual Router Redundancy Protocol (VRRP).

20. The system of claim 17, further comprising a plurality of non VXLAN enabled leaf switches residing in a physical layer 2 network and being connected to the spine routers.

* * * * *